United States Patent [19]
Van Patten et al.

[11] 3,780,723
[45] Dec. 25, 1973

[54] PRESSURE CONTROL SYSTEM FOR G-SUIT

[75] Inventors: Robert E. Van Patten, Kettering, Ohio; Dana B. Rogers, Duxbury, Mass.

[73] Assignee: The United States of America as represented by the Secretary of the Air Force, Washington, D.C.

[22] Filed: July 18, 1972

[21] Appl. No.: 273,005

[52] U.S. Cl. ................................. 128/1 A, 137/38
[51] Int. Cl. ............................................. A61f 5/37
[58] Field of Search................ 128/1 A, 1 R, 142.5, 128/204; 98/1.5; 137/38, 81

[56] References Cited
UNITED STATES PATENTS

| | | | |
|---|---|---|---|
| 2,683,001 | 7/1954 | MacIntyre | 137/38 |
| 2,760,484 | 8/1956 | Ferwerda | 128/1 A |
| 3,089,482 | 5/1963 | Gray | 128/1 A |
| 3,719,193 | 3/1973 | Boyle | 137/38 |

*Primary Examiner*—William E. Kamm
*Attorney*—Harry A. Herbert, Jr. et al.

[57] ABSTRACT

A control system for a G-suit having an acceleration signal and a time rate of change of the acceleration signal supplied to a summing circuit with the output of the summing circuit being supplied to a comparator through a function generator circuit. The function generator output is compared with a reference level in the comparator circuit with the output of the comparator being used to energize a relay that controls a solenoid between the air supply and the G-suit. The function generator programs pressure to the G-suit according to a particular function of the output signal of the summing circuit. A pressure signal from the pressure suit and rate of change in suit pressure signal are summed in a second summing circuit with the output of the second summing circuit being used as a third input to the comparator circuit.

2 Claims, 3 Drawing Figures

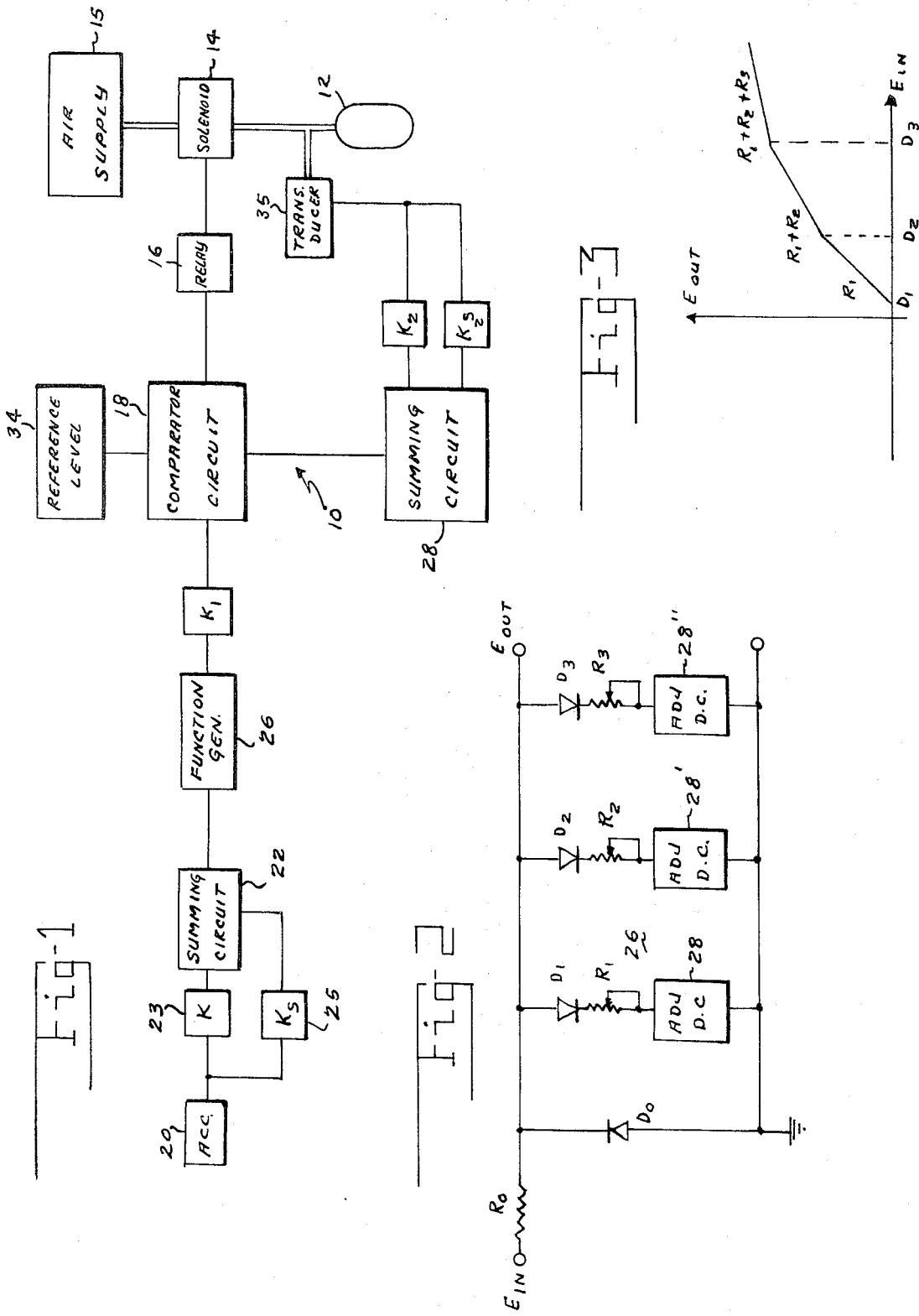

PRESSURE CONTROL SYSTEM FOR G-SUIT

BACKGROUND OF THE INVENTION

Current G-suit valves are mechanical devices which require a certain acceleration in order to operate. It is necessary to design the valves so that they are not operated by transient accelerations, so that the pilot or aircrewman is not distracted by transient inflations. Therefore, when protection is required, the valve does not operate until after the pilot has already been subjected to an acceleration for some time in an unprotected condition.

BRIEF SUMMARY OF THE INVENTION

According to this invention, the delay in the initiation of protection is solved by providing an electronic system which takes both the acceleration level and the time rate of change of acceleration into account, which makes it possible to initiate protective action at an earlier time without subjecting the pilot to unnecessary transient inflations. Also, a function generator is used so that the inflation as a function acceleration may be made to follow a desired pattern. Thus, it is possible to initiate protective action at an earlier time so as to increase the pilot's ability to tolerate sustained acceleration stress such as may be encountered in combat maneuver situations.

IN THE DRAWING

FIG. 1 is a circuit schematic in block form of a valve control system for G-suits.

FIG. 2 is a circuit schematic of one type of function generator that may be used with the device of FIG. 1.

FIG. 3 shows the characteristic of $E_{in}$ vs $E_{out}$ for the device of FIG. 2.

DETAILED DESCRIPTION OF THE INVENTION

Reference is now made to FIG. 1 of the drawing which shows a control system 10 for a G-suit indicated schematically at 12. An air control solenoid 14 which controls the flow of air from an air supply 15 to the G-suit 12 is controlled by a relay 16 in response to the output from comparator circuit 18. The comparator 18 may be a conventional summing operational amplifier used as a comparator.

The output of an accelerometer 20 is supplied to the summing circuit 22 through amplifier 23. A time rate of change of the accelerometer output is also supplied to the summing circuit 22 from differentiating circuit 25.

The output of the summing circuit is fed to a function generator 26, such as shown in FIG. 2, which provides an output as a function of input as shown in FIG. 3.

Other function generators than that shown may be used. For example, the function generator on page 374 of EAI "Handbook of Analog Computation" may be adapted for use with device of the invention when it is desired to have a short rest period between two rising periods. Other function generators may be provided to make inflation as a function of acceleration follow any desired sequence. The diodes $D_1$, $D_2$, and $D_3$ conduct when the supply voltages, set in adjustable D.C. supplies 28, 28' and 28'', are exceeded which sets the break point in the characteristic curve shown in FIG. 3. The resistances $R_1$, $R_2$, and $R_3$ are adjusted to control the slope. This then provides different rates of increase in suit pressure with increase in the acceleration signal.

The resistance indicated at $R_o$ may include all or part of the impedance of the source supplying the function generator.

The output signal of the function generator is compared in comparator 18 with a reference signal from the reference level circuit 34 to prevent operation of relay 16 during transient accelerations. A suit pressure signal and a rate of change of suit pressure signal, derived from pressure transducer 35, are supplied to a summing circuit 28 with the output of the summing circuit being applied as a third input to comparator circuit 18.

In the operation of the device, the output of accelerometer 20 and a time rate of change of the accelerometer signal are summed in summing circuit 22 with the output of the summing circuit being supplied to a function generator 26. The output of the function generator is compared with a predetermined reference level signal from circuit 34 to block transient inflations due to transient accelerations. An output from the comparator circuit 18 operates relay 16 to energize solenoid 14 and allow air from supply 15 to flow into the pressure suit 12. So that the pilot is not permitted to remain in an unprotected condition for any appreciable length of time, the time rate of change signal to the summing circuit 22 can act to provide protection more rapidly in the same manner as described above.

To control the rate at which air is supplied to the pressure suit and to deenergize solenoid 14 when the proper pressure level has been reached in the pressure suit, a pressure signal and a pressure rate signal are supplied to a summing circuit 28, from pressure transducer 35, with the output of summing circuit 28 being supplied as a third input to comparator 18. The input to comparator 18 from summing circuit 28 will have the opposite sign than the input from function generator 26.

There is thus provided a pressure control system for a G-suit which will block transient inflations of the G-suit but will give more immediate protection when needed.

We claim:

1. A pressure control system for pressure suit comprising; a pressure suit, means for providing a supply of air under pressure to said pressure suit; means for controlling the flow of air from the air supply to the pressure suit; said controlling means including a solenoid valve connected between the air supply and the pressure suit; a first summing circuit; means for supplying an acceleration responsive signal to a first input of said summing circuit; means for supplying a signal proportional to the time rate of change of the acceleration responsive signal to a second input of said first summing circuit; a comparator circuit; means for applying a signal, proportional to a certain predetermined function of the output of said first summing circuit, to a first input of the comparator circuit; means for supplying a reference level signal to a second input of said comparator circuit; a second summing circuit; means for supplying a signal proportional to pressure in said pressure suit to a first input to said second summing circuit; means for supplying a signal proportional to the time rate of change of pressure in the pressure suit to a second input of said second summing circuit; means for supplying the output of said second summing circuit to a third input of said comparator circuit; means responsive to the output of said comparator circuit for controlling the operation of said solenoid valve.

2. The device as recited in claim 1 wherein said function generator includes means for changing the rate of increase of suit pressure with an increase in the level of the output signal from the first summing circuit at predetermined voltage levels of the first summing circuit output signal.

* * * * *